Dec. 10, 1929.  P. MUELLER  1,738,915
PIPE COUPLING
Filed May 7, 1924  2 Sheets-Sheet 1
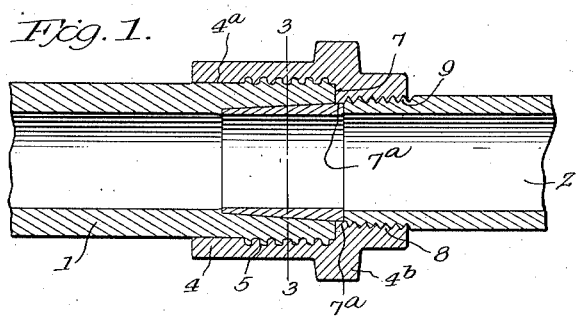
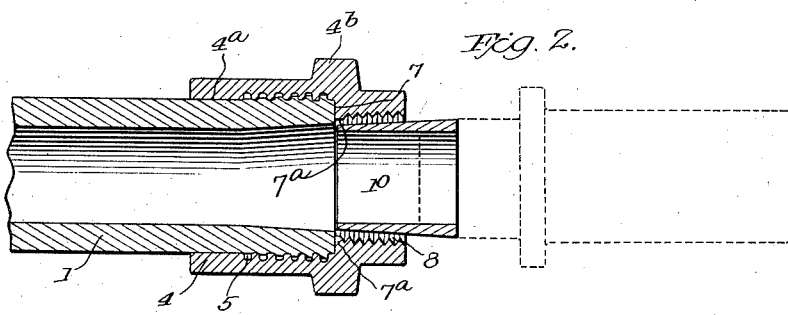
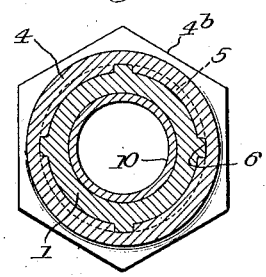  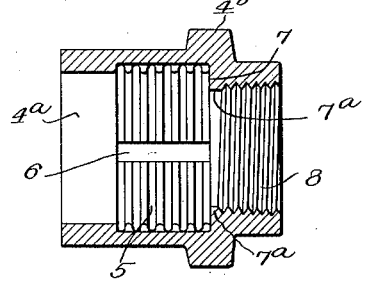
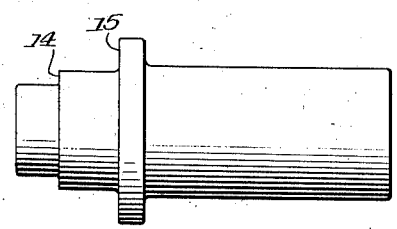
Inventor
Philip Mueller,
By *Cushman, Bryant & Darby*
Attorney Dec. 10, 1929.  P. MUELLER  1,738,915
PIPE COUPLING
Filed May 7, 1924  2 Sheets-Sheet 2

Inventor
Philip Mueller,
By Cushman, Bryant Darby
Attorneys

Patented Dec. 10, 1929

1,738,915

UNITED STATES PATENT OFFICE

PHILIP MUELLER, OF DECATUR, ILLINOIS, ASSIGNOR, BY MESNE ASSIGNMENTS, TO MUELLER CO., OF DECATUR, ILLINOIS, A CORPORATION OF ILLINOIS

PIPE COUPLING

Application filed May 7, 1924. Serial No. 711,651.

The present invention relates to improvements in pipe couplings, and particularly to couplings of the character or type which are employed for connecting pipes of relatively soft or ductile material, such as lead, with pipes of hard metal, such as iron or brass.

In making connections of house pipes for water or gas distribution, it is frequently necessary to connect pipes of relatively soft metal, such as lead, with service mains, which are commonly made of iron.

Various forms of couplings for effecting such connections in lieu of the wiped joints that are commonly employed by plumbers have been proposed. Experience with such couplings, however, has shown that they have, as a rule, either been so complicated as to make them relatively expensive, or have required the use of special implements or tools in their application or the necessity of such skill on the part of the party using them that they have not come into general use.

The object of the present invention is to provide a very simple and inexpensive coupling, which may be readily applied by unskilled workmen, without necessitating the use of special implements or tools, and which will form an effective, tight, joint between a pipe of relative soft or ductile metal and a hard metal pipe.

With this and other objects in view the invention consists in the particular construction that will be hereinafter described and pointed out in the claims.

In the accompanying drawings:—

Fig. 1 is a longitudinal section through sections of two pipes connected by a coupling embodying the present invention.

Fig. 2 is a sectional view illustrating the position of the parts when the coupling is being fitted to the soft or ductile metal pipe.

Fig. 3 is a section substantially on the line 3—3 of Figure 1.

Fig. 4 is a longitudinal section through the main sleeve of the coupling, showing the same detached.

Figs. 5 and 6 are view of implements used in assembling the parts of the coupling.

Figure 7:
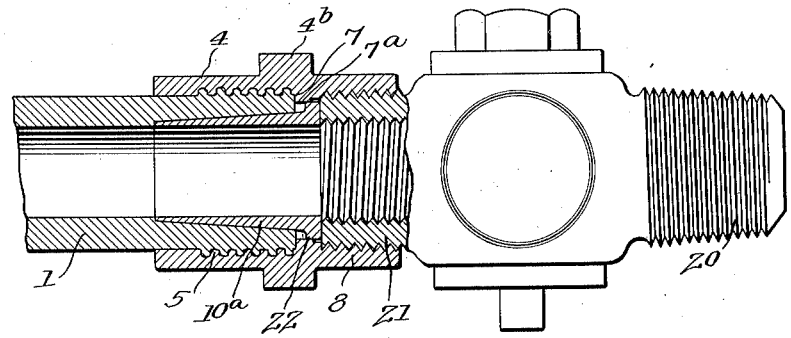
Fig. 7 is a view partly in section showing the application of the coupling to a corporation stop.

In the drawings, in the several views of which corresponding parts are designated by like reference characters, 1 designates a section of a pipe of soft or ductile metal, for example lead, and 2 a section of a pipe of hard metal, such as iron.

The coupling, embodying the present invention, for connecting the pipe sections 1, 2, includes a main sleeve 4, which is provided at one end with a socket of suitable diameter to receive the end of the soft metal pipe 1.

Interiorly the socket in the member 4 is provided with a series of circumferential grooves 5, and with any suitable number of longitudinally extending grooves 6, which intersect the circumferential grooves. The grooves 5 do not extend throughout the depth of the socket so that the latter is provided at its outer end with an internally smooth section 4ª. This section 4ª encircles a substantial portion of the pipe length and acts to prevent loosening of the connection between the ductile metal pipe and the coupling member by vibration. It is frequently necessary to bend the ductile metal pipe after it has been coupled to a hard metal pipe, and with the construction described, such bending must necessarily be beyond the outer end of the section 4ª so that a substantial portion at the end of the pipe is enclosed within the coupling and will not be affected by such a bending. As shown, the sleeve 4 is provided with an external, polygonal formed, projection 4ᵇ adapted to furnish a secure hold for a wrench.

The inner end of the socket is formed by an annular inwardly projecting shoulder 7 and the body of the sleeve on the opposite side of the shoulder from the socket is interiorly threaded as at 8. The threads 8 are of a diameter corresponding to the threaded section 9, of the hard metal pipe 2, with which the coupling is to be engaged. The threads 8 do not extend throughout the length of the body from the face of the shoulder 7 but adjacent the inner end thereof there is a short unthreaded section 7ª, which constitutes the inner annular edge of the shoulder.

In order to expand the wall of the soft metal pipe 1 into the grooves 5, 6, of the coupling sleeve, and thus firmly connect these parts, use is made of a longitudinally tapered sleeve 10.

The diameter of the sleeve 10 is such that it may be passed through the opening in the annular shoulder 7 at the inner end of the socket in the coupling and the diameter of the thin end of said sleeve is substantially the same as that of the bore of the soft metal pipe 1.

Initially the main sleeve 4 is slipped over one end of the soft metal pipe 1 and, by means of a suitable swage (shown in Figure 5) and hammer portions of the body of the pipe are forced outward into the grooves 5, 6, as the swage is driven into the pipe.

Then the swage is withdrawn and the sleeve 10 is inserted through the opening in the shoulder 7 and by means of such an implement as is shown in Figure 6, driven into the end of the soft metal pipe for substantially its full length.

The movement of the sleeve 10 longitudinally of the pipe 1 acts to force portions of the body of the pipe further into the grooves 5, 6, completely filling such grooves and effecting a very firm connection between the pipe and sleeve 4.

The implement employed for thus forcing the sleeve 10 into position is provided with two annular shoulders 14, 15, adapted to, respectively, bear against the outer end of the sleeve 10 and, when the sleeve has been forced into the pipe 1 to the desired extent, the end of the main sleeve 4. The distance between the shoulders 14, 15, is such that the implement will force the sleeve 10 into the pipe 1 for substantially the full length of such sleeve before the face of the shoulder 15 contacts with the end of the main body 4.

When the pipe 2 is screwed into engagement with the thread 8, the two pipes will be securely coupled. As before described, the thread 8 does not extend to the socket portion of the sleeve 4 that receives the ductile metal pipe so that there is no contact between the inner end of the pipe 2 and the soft metal pipe 1, but such adjacent ends will be separated by the length of the annular surface 7ª of the shoulder 7, the end of the hard metal pipe abutting the outer end of the expanding sleeve 10 which is closely surrounded by the surface 7ª so that a rigid lateral contact is provided between the sleeves 10 and 4.

When the sleeve 10 has been completely driven into the body of the pipe 1, the wall of the latter will have been expanded into the grooves 5, 6, of the coupling, as shown in Figure 1, so that these parts will be immovably connected. It will be seen that the engagement of the wall of the pipe 1 with the circumferential grooves 5 acts to effectually prevent relative longitudinal movement between the coupling and pipe and that the ribs of the soft metal pipe forced into the longitudinal grooves 6 effectively prevent any relative rotary movement between said pipe and coupling.

As shown in Figure 1, the sleeve 10 is preferably made longer than the depth of the grooved portion of the socket in the coupling, which receives the end of the soft metal pipe, so that the metal of said pipe is gradually expanded radially without forming any abrupt bends therein. The interior of the sleeve 10 is practically the same as that of the bore of the pipe 1 so that it offers no obstruction to the flow of liquid or gas therethrough.

In the embodiment of the invention illustrated, four longitudinally extending grooves 6 are provided in the coupling socket and when the sleeve 4 is properly engaged with the soft metal pipe there are four raised ribs on the pipe engaging the socket wall. Any suitable number of grooves 5, 6, may be provided, depending on the size of the pipe, and there may also be other slight changes or modifications of the particular embodiment of the invention illustrated without departing from the scope thereof.

An important feature of the coupling of the present invention is that it may be employed for connecting hard and soft metal pipes of different diameters, being in this particular, superior to earlier proposed constructions in which the inner end of the hard metal pipe is directly engaged by or with the relatively soft metal pipe, which renders the coupling unfit for use when it is desired to connect a lead pipe, for example, with an iron main which is of greater or materially less diameter than the lead pipe.

Referring to Fig. 7, the improved coupling is shown as provided for connecting a corporation stop with a lead house service pipe. It is customary to provide the outlet of corporation stops with external threads of a diameter greater than the regular iron pipe threads. That is, for example, when the iron pipe thread 20 is a three-quarter inch thread, the outlet thread 21 of the same stop will have a one inch thread.

To employ applicant's improved coupling for connecting such a corporation stop with a pipe 1 of ductile metal, it is merely necessary to make the thread 8 of such diameter as to properly receive the thread 21 of the corporation stop.

Figure 8:
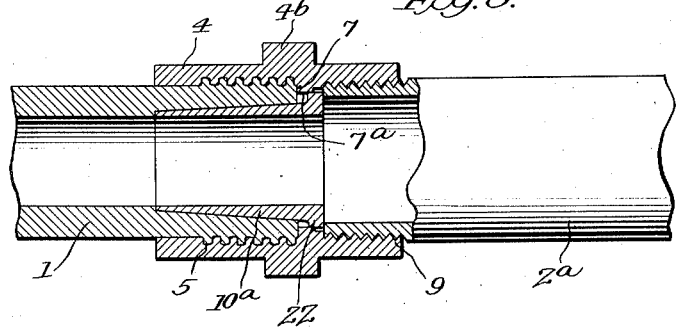
Fig. 8 is a similar view showing the coupling employed for connecting a soft metal pipe with a hard metal pipe, the latter being of greater diameter than the soft metal pipe.
Figure 9:
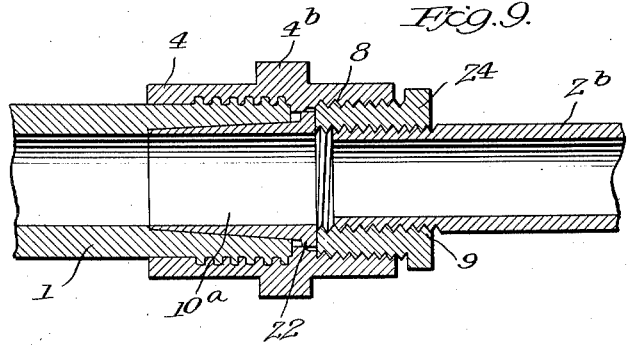
Fig. 9 is a similar view showing a modification in which a coupling is employed for connecting a hard metal pipe with a soft metal pipe, the hard metal pipe being of materially smaller diameter than the soft metal pipe.

In the form of the invention illustrated in Figs. 7, 8 and 9, it will be seen that the inner expanding sleeve 10ª is provided at its outer end with an annular outwardly projecting shoulder 22, and this shoulder separates the adjacent ends of the soft and hard metal pipes.

In Fig. 8 the coupling is shown as employed for connecting a ductile metal pipe 1 with a hard metal pipe 2ª, in which the latter is of considerably greater diameter than the pipe 1.

It will be understood that in the appended claims, the term "hard metal pipe" is supposed to include a pipe or tube proper, such as shown in Figs. 1, 8 and 9, and also in other similar fixtures such as the corporation stop shown in Fig. 7.

In case the hard metal pipe 2ᵇ, which is to be connected with the soft metal pipe 1, is of materially less diameter than the soft metal pipe, a suitable spacer sleeve 24 may be provided. Such sleeve as shown at Fig. 9 has an external thread engaging the thread 8 of the coupling sleeve proper, and its inner end abuts against the outer end of the expanding sleeve 10ª. Said spacer sleeve 24 is provided with an internal thread which engages the thread 9 on the hard metal pipe 2ᵇ.

The form of expanding sleeve shown in Figs. 7, 8 and 9, provides a broader bearing for the inner end of the hard metal pipe than is afforded by the form of such sleeve shown in Figs. 1 and 2.

I claim:

1. The combination with a hard metal pipe and a pipe of ductile metal, of a coupling sleeve having one end connected to the hard metal pipe and provided at its opposite end with a socket receiving one end of the ductile metal pipe, said sleeve having an interior, integral, annular shoulder forming an abutment for the end face of the ductile metal pipe therein and the circumferential wall of said socket having intersecting circumferential and longitudinal grooves formed therein, and a longitudinally tapered sleeve within said socket contacting with the inner periphery of the annular shoulder and the ductile metal pipe and expanding the wall of the ductile metal pipe, the portion of the ductile metal pipe within said socket provided with projections extending into said grooves to prevent relative rotary and longitudinal movement between the coupling and ductile metal pipe.

2. The herein described coupling for connecting a ductile metal pipe with a hard metal pipe comprising a sleeve having at one end a socket, adapted to receive an end of the ductile metal pipe to which the coupling is to be applied, said socket having adjacent its outer end a smooth surfaced section, that closely surrounds the pipe, and provided in rear of said section with intersecting grooves extending longitudinally and circumferentially of the socket into which the wall of the ductile metal pipe is adapted to be expanded to prevent relative rotary and longitudinal movement between said pipe and sleeve, the inner end of said socket being formed by an inwardly projecting annular shoulder and the body of the sleeve beyond such shoulder being provided with a thread adapted to be engaged by a thread on the hard metal pipe to which the coupling is to be applied, and a longitudinally tapered sleeve adapted to pass through the opening in said annular flange and by movement longitudinally expand the ductile metal pipe into said groove in the said socket.

3. The herein described coupling for connecting a ductile metal pipe with a hard metal pipe comprising a sleeve having at one end a socket, adapted to receive an end of the ductile metal pipe to which the coupling is to be applied, and having its annular wall interiorly formed with intersecting grooves to permit the wall of the ductile metal pipe to be expanded into close engagement with said sleeve, to positively prevent relative rotary and longitudinal movement between said sleeve and pipe, the inner end of said socket being formed by an inwardly extending annular shoulder and the body beyond said shoulder having a thread adapted to be engaged with a thread on the hard metal pipe to which the coupling is to be applied, the thread engaging the hard metal pipe terminating short of the annular shoulder, and a longitudinally tapered sleeve adapted by movement longitudinally through the opening in said annular shoulder to expand the ductile metal pipe into said grooves in the said socket and said tapered sleeve being in annular contact with the wall of said opening when in operative position.

In testimony whereof I have hereunto set my hand.

PHILIP MUELLER.